(12) United States Patent
Tajima (10) Patent No.: US 6,657,327 B2
(45) Date of Patent: Dec. 2, 2003

(54) LINEAR DIRECT CURRENT MOTOR

(75) Inventor: Satoru Tajima, Ishikawa (JP)

(73) Assignee: Sodick Co., Ltd., Kanagawa (JP)

( * ) Notice: Subject to any disclaimer, the term of this patent is extended or adjusted under 35 U.S.C. 154(b) by 111 days.

(21) Appl. No.: 09/980,087

(22) PCT Filed: May 30, 2001

(86) PCT No.: PCT/JP01/02795
§ 371 (c)(1),
(2), (4) Date: Nov. 30, 2001

(65) Prior Publication Data

US 2002/0163256 A1 Nov. 7, 2002

(30) Foreign Application Priority Data

Mar. 30, 2000 (JP) ........................................ 2000-097865

(51) Int. Cl.⁷ ..................... H02K 33/18; H02K 41/03
(52) U.S. Cl. ....................... 310/12; 310/16; 310/52; 310/58
(58) Field of Search ............................... 310/12, 13, 14, 310/16, 17, 52, 54, 58, 61; 29/596–598

(56) References Cited

U.S. PATENT DOCUMENTS 5,703,418 A * 12/1997 Assa ........................... 310/12
5,751,077 A * 5/1998 Gonzalez ..................... 310/12

FOREIGN PATENT DOCUMENTS

| JP | 48-068706 | | 8/1973 | |
|---|---|---|---|---|
| JP | 61-010078 | | 1/1986 | |
| JP | 63124754 | * | 5/1988 | .......... H02K/33/18 |
| JP | 01-194847 | | 8/1989 | |
| JP | 10-323012 | | 12/1998 | |
| JP | 11-206099 | | 7/1999 | |
| JP | 2001-128438 | | 5/2001 | |

* cited by examiner

Primary Examiner—Nestor Ramirez
Assistant Examiner—David W. Scheuermann
(74) Attorney, Agent, or Firm—McDermott, Will & Emery; Paul Devinsky

(57) ABSTRACT

A linear direct current motor comprises a center yoke (1) ending in the longitudinal direction X, an outer yoke (31) arranged parallel to the center yoke, a peat magnet (41) for generating magnetic field between the outer yoke and the center yoke, and a coil assembly (10) that is movable in the longitudinal direction X having an opening through which the center yoke passes. This coil assembly includes a flat cooling pipe (7) having a cross section elongated in the longitudinal direction and a U-shaped fold for passing the center yoke through, a manifold (9) having a cooling medium inlet (9A) and a cooling medium outlet (9B) and being connected to both ends of the cooling pipe, and a coil (5) wound around the cooling pipe and the manifold.

17 Claims, 7 Drawing Sheets

FIG.11
PRIOR ART

LINEAR DIRECT CURRENT MOTOR

FIELD OF THE INVENTION

The present invention relates to a linear DC motor applied to a small precision machine tool or the like.

DESCRIPTION OF THE RELATED ART

Figure 11:
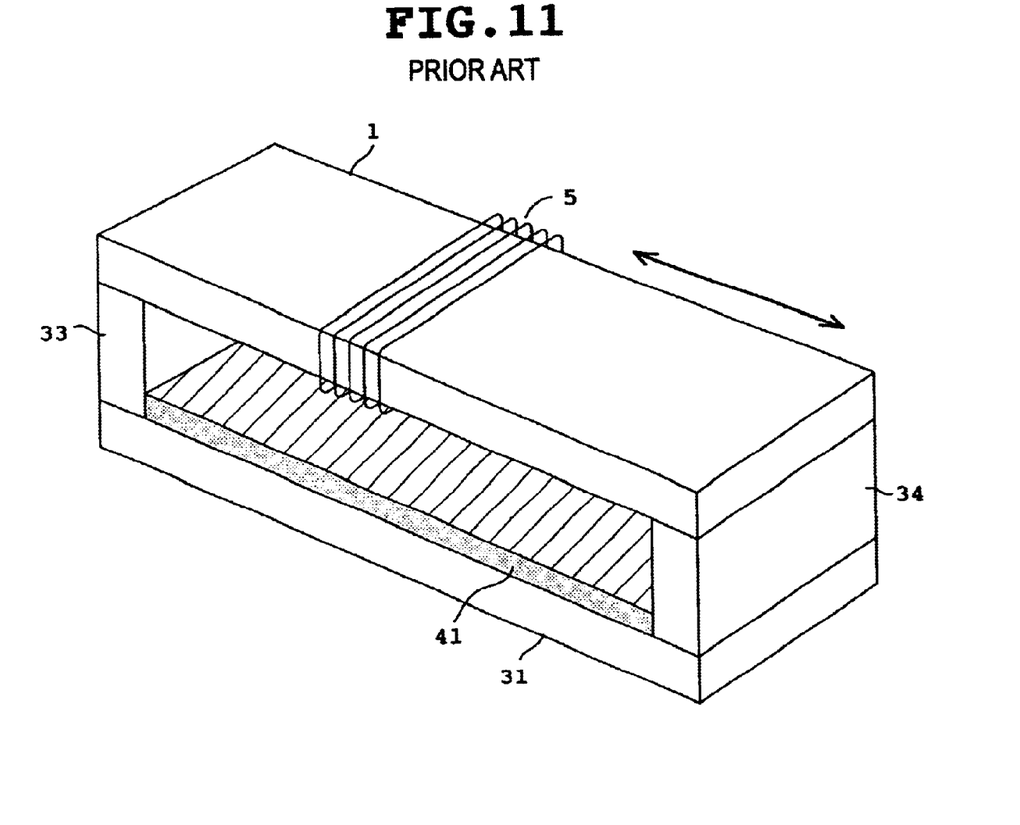
FIG. 11 is a perspective view showing a linear direct current motor of the related art.

Coreless linear DC rotors capable of simply achieving precision positioning and high speed drive are suitable for small precision machine tools. A typical linear direct current motor of this type is shown in FIG. 11. A pair of linearly extending flat plate-shaped yokes 31, 1, an arranged parallel to each other, the ends of each of the two yokes are connected by two side yokes 33 and 34. A permanent magnet 41 is attached to the outer yoke 31 so that magnetic field is formed between the center yoke 1 and the outer yoke 31. The yokes 1, 31, 33 and 34 form a closed flux path. An excitation coil 5 wound on a suitable frame is mounted on the center yoke 1. The thrust (F) generated by the linear direct current motor is proportional to the product of magnetic flux density (B) of the magnetic field, the current (I) supplied to the coil, the length (L) of the coil in the magnetic field, and the number of turns (n) of the coil. The coil 5 is movable in the longitudinal direction of the center yoke 1, as shown by the double-headed arrow, by means of the thrust (F).

The advantage of such a linear direct current motor is its use of a small mover having low inertial mass. Also, as long as the magnetic field is uniformly formed, there is no cogging or torque ripple. This arrangement may be used to achieve a high precision servo control having excellent responsiveness.

An object of the present invention is to provide a linear direct current motor that efficiently cools beat generated in the coil.

A linear direct current motor according to the present invention comprises a center yoke extending in the longitudinal direction, an outer yoke arranged parallel to the center yoke, a permanent magnet for generating magnetic field between the outer yoke and the center yoke, and a coil assembly that is movable in the longitudinal direction and having an opening tough which the center yoke passes.

This coil assembly preferably includes a flat cooling pipe having a cross section elongated in the longitudinal direction and a U-shaped fold for passing the center yoke through, a manifold connected to the ends of the cooling pipe having a cooling medium inlet and a cooling medium outlet, and a coil wound around the cooling pipe and the manifold.

The cooling pipe preferably has a plurality of minute holes through which coolant can flow, the holes being aligned in the longitudinal direction.

Additional objects and novel features of the invention will be set forth in the description that follows or will be apparent to the artisan upon practice of the invention.

DETAILED DESCRIPTION OF THE PREFERRED EMBODIMENTS

An embodiment of a linear direct current motor according to the present invention will now be described with reference to FIG. 1, FIG. 2, FIG. 3, FIG. 4, FIG. 5 and FIG. 6.

Figure 1:
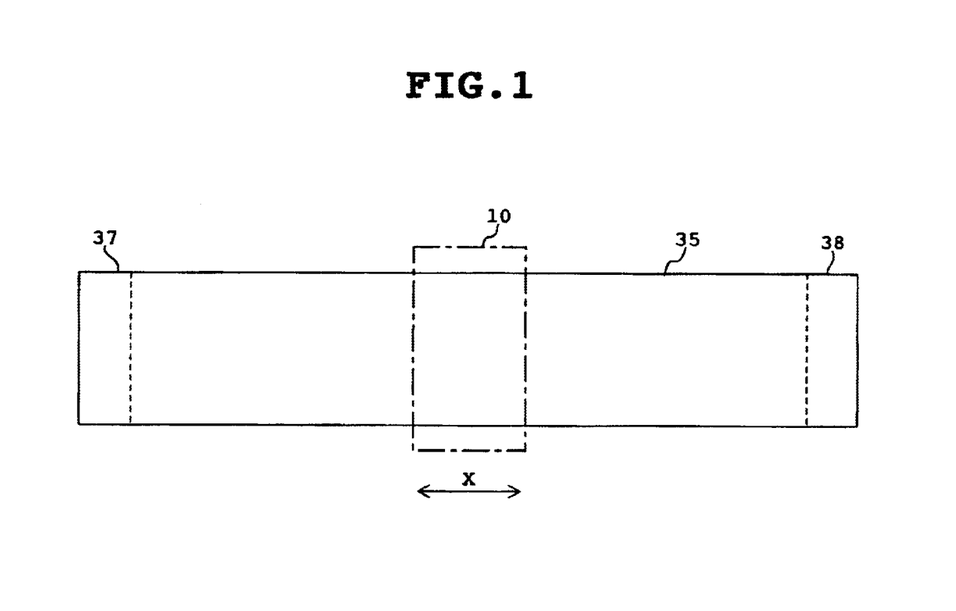
FIG. 1 is a plan view depicting on embodiment of a linear direct current motor according to the present invention.
Figure 2:
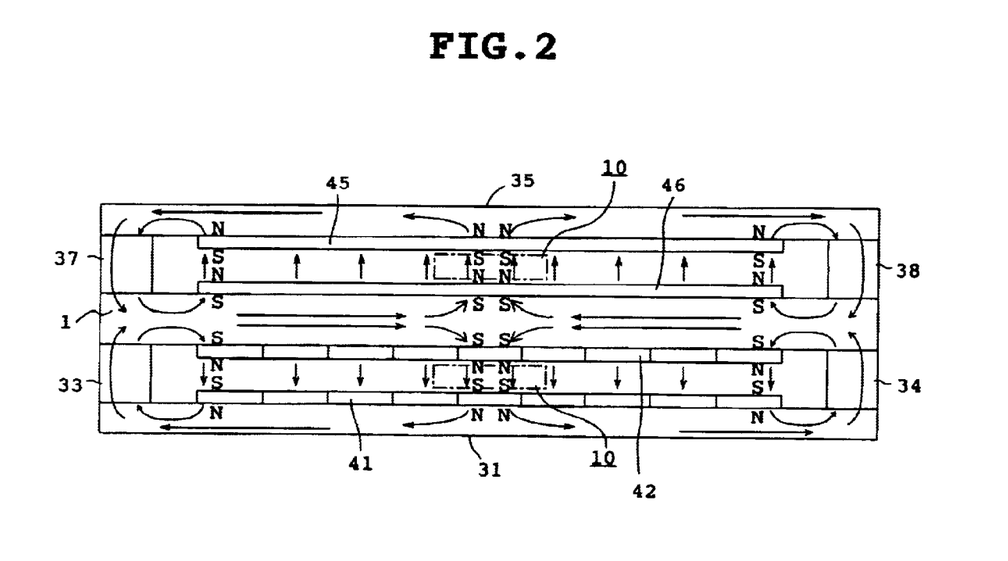
FIG. 2 is a side elevation showing the linear direct current motor of FIG. 1.

A permanent magnet 41 for forming a magnetic field is attached to an upper surface of a flat plate-shaped lower outer yoke 31. The permanent magnet 41 is preferably made of a plurality of permanent magnets aligned in the longitudinal direction of the lower outer yoke 31.

A flat plate-shaped center yoke 1 positioned above the lower cuter yoke 31, passes through an opening in a coil assembly 10. The size of a gap formed between the center yoke 1 and the coil assembly 10 is preferably maintained at a specified value. The coil assembly 10 constitutes a mover, guided in the longitudinal direction X by the center yoke 1. The respective ends of the lower outer yoke 31 and the center yoke 1 are respectively connected by side yokes 33 and 34. In the illustrated embodiment, a permanent magnet 42 is attached to a lower surface of the center yoke 1 in order to efficiently generate thrust.

In this way, a magnetic flux is generated which flows from one pole face of the permanent magnet 41 through the lower outer yoke 31, the side yoke 33, the center yoke 1 and the permanent magnet 42 and to the other pole face of the permanent magnet 41. A magnetic flux is also generated which flows from one pole face of the permanent magnet 41 through the lower outer yoke 31, the side yoke 34, the center yoke 1 and the permanent magnet 42 and to the other pole face of the permanent magnet 41—

Differing from the linear direct current motor illustrated in FIG. 11, a plate shaped upper outer yoke 35 is positioned above the center yoke 1. The respective ends of the upper outer yoke 35 and the center yoke 1 are connected by side yokes 37 and 38. In the illustrated embodiment, the lower outer yoke 31, the center yoke 1 and the upper outer yoke 35 are arranged parallel to each other. A permanent magnet 45, which functions as a field magnet for forming a magnetic field, is attached to a lower surface of the upper outer yoke 35.

A permanent magnet 46 is attached to an upper surface of the center yoke 1 in order to efficiently generated thrust. In this way, a magnetic flux is generated which flows from one pole face of the permanent magnet 45 through the upper outer yoke 35, the side yoke 37, the center yoke 1 and the permanent magnet 46 to the other pole face of the permanent magnet 45. A magnetic flux is also generated which flows from one pole face of the permanent magnet 45 through the upper outer yoke 35, the side yoke 38, the center yoke 1 and the permanent magnet 46 to the other pole face of the permanent magnet 45.

Figure 3:
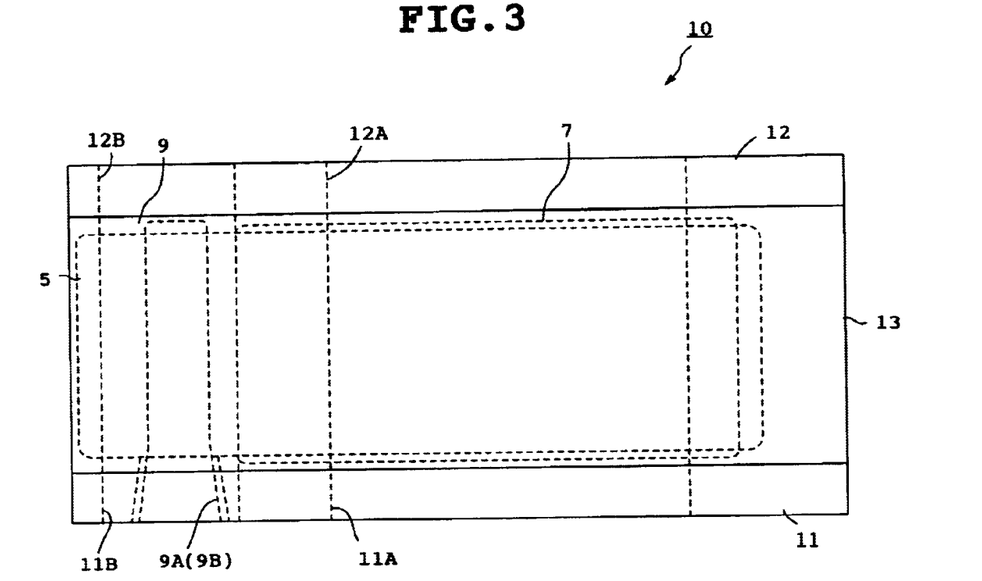
FIG. 3 is a side elevation showing the coil assembly of FIG. 1.
Figure 4:
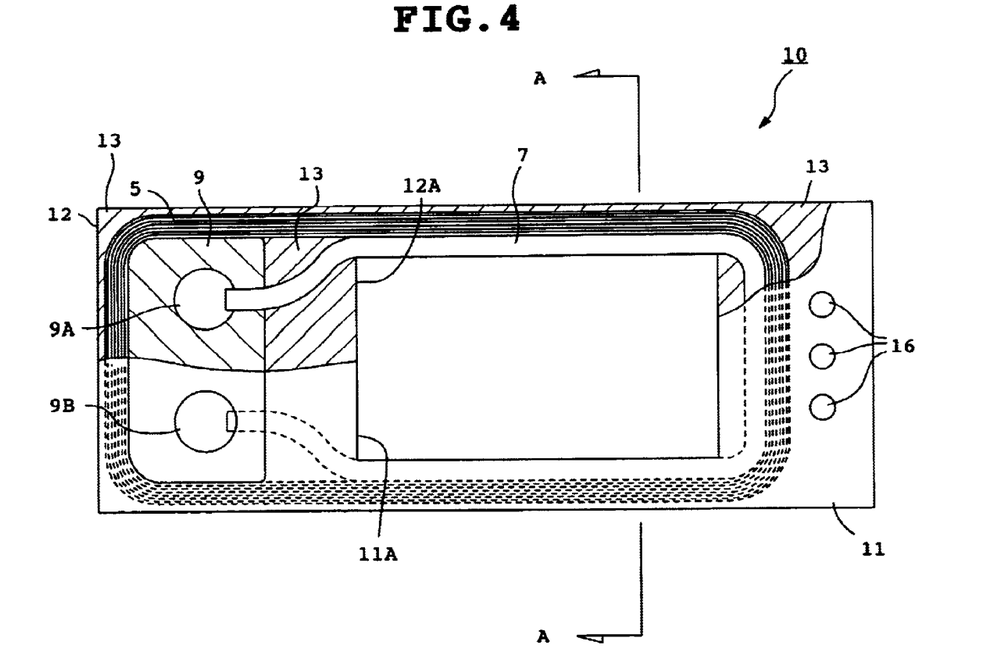
FIG. 4 is a front view showing the coil assembly of FIG. 1.
Figure 5:
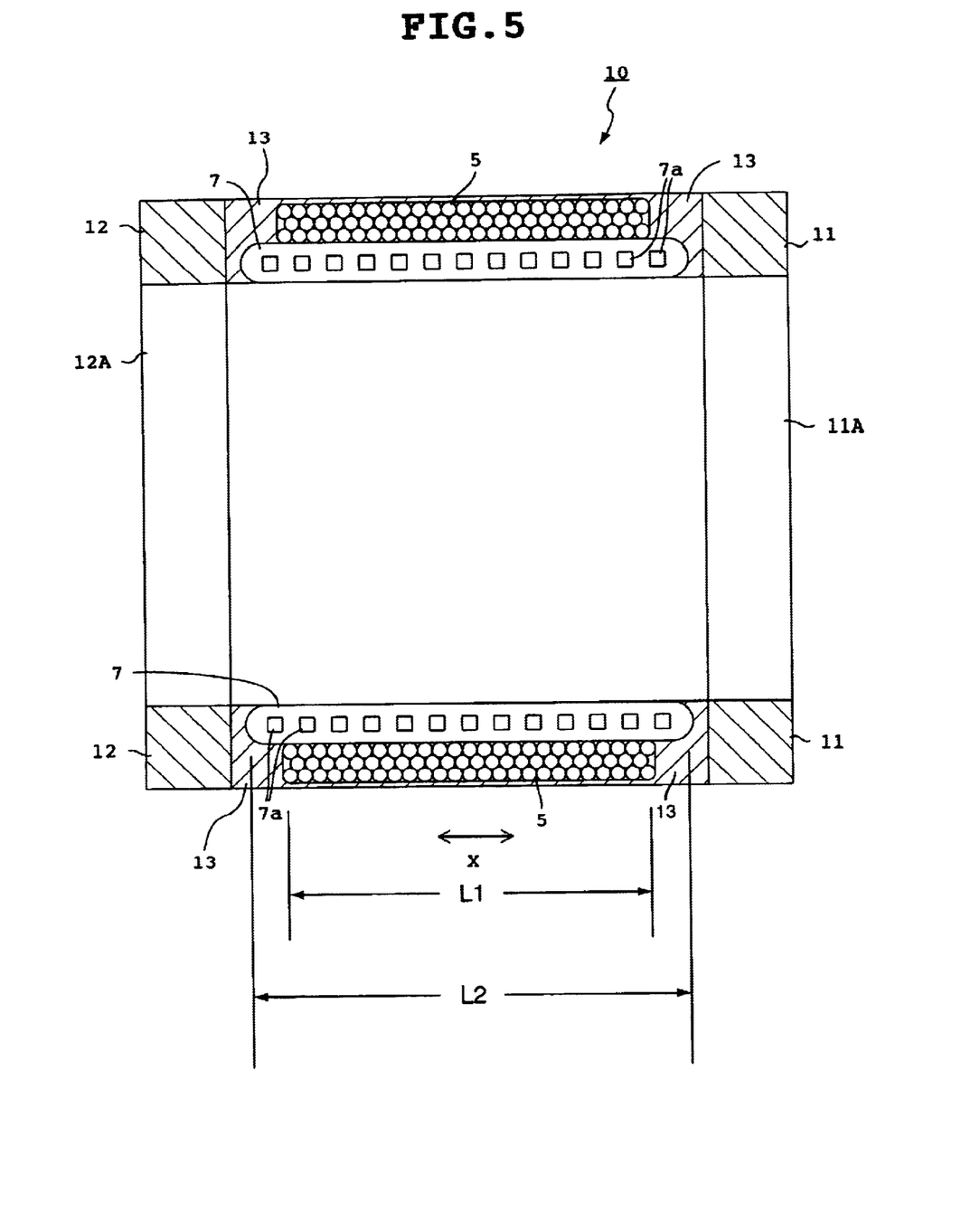
FIG. 5 is a cross sectional view showing the coil assembly viewed along the line A—A in FIG. 4.

A coil 5 of the coil assembly 10 is provided between a pair flat plates 11 and 12, that are arranged parallel to each other. A flat cooling pipe 7 for cooling the coil 5 is provided at an inner side of the coil 5, between the pair of plates 11 and 12. A coolant, in gas or liquid form, can circulate inside the cooling pipe 7. The pair of plates 11 and 12 have respective openings 11A and 12A through which the center yoke 1 passes. The openings 11A and 12A have an outline corresponding substantially to the rectangular cross section of the center yoke 1 to which the permanent magnets 42 and 46 are attached.

As best seen in FIG. 4, the flat cooling pipe 7 is folded back along the contours of the openings 11A and 12A. As best seen in FIG. 5, the cooling pipe 7 preferably has a cross section elongated in the longitudinal direction X. The length of the elongated cross section of the cooling pipe 7 is preferably larger than the length of the coil 5 in the longitudinal direction X. Accordingly, a large section of the surface of the coil 5 is cooled by the cooling pipe 7.

A plurality of minute holes 7a through which coolant can flow are preferably formed in the cooling pipe 7, and aligned in the longitudinal direction X. A manifold 9 that is a substantially rectangular block, is provided aligned with the cooling pipe 7. The manifold 9 has an inlet 9A and an outlet 9B which respectively communicate with the two ends of the cooling pipe 7. The cooling pipe 7 and the manifold 9 are preferably made from a material that has no material affect on magnetic flux, such as an aluminum alloy or a copper alloy. The cooling pipe 7 and the manifold 9 may be connected by brazing, and act effectively as a frame for winding the coil 5. Openings 11B and 12B through which the manifold 9 passes are respectively formed in the pair of plates 11 and 12. Three holes 16 for passing two lead wires of the coil 5 and a single ground wire are formed in the plate 11. The coil 5, the cooling pipe 7 and the manifold 9 are covered by a rectangular resin block A method of manufacturing a coil assembly of the linear direct current rotor of the present invention will now be described.

Figure 6:
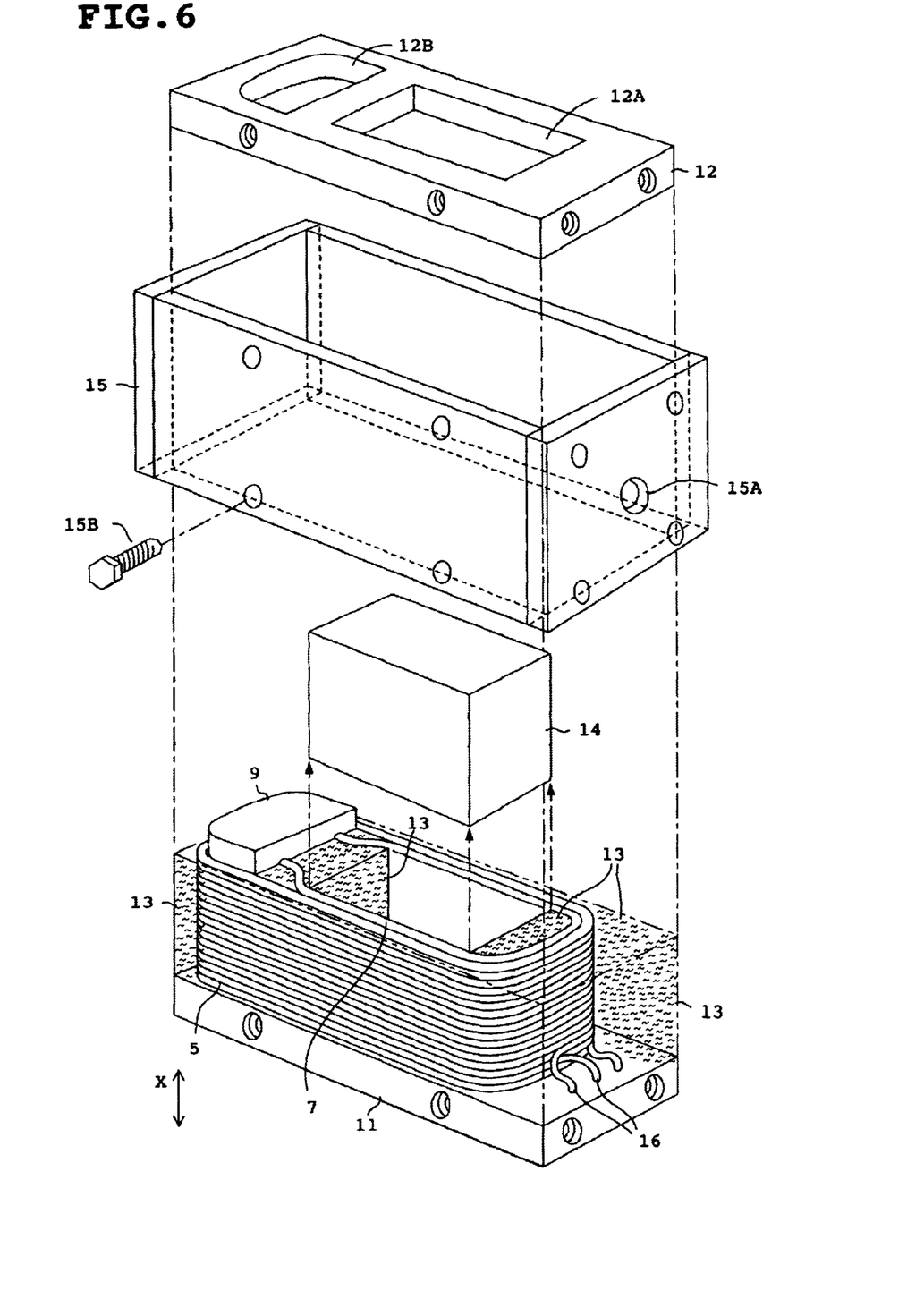
FIG. 6 is a perspective view showing the coil assembly of FIG. 1.
Figure 7:
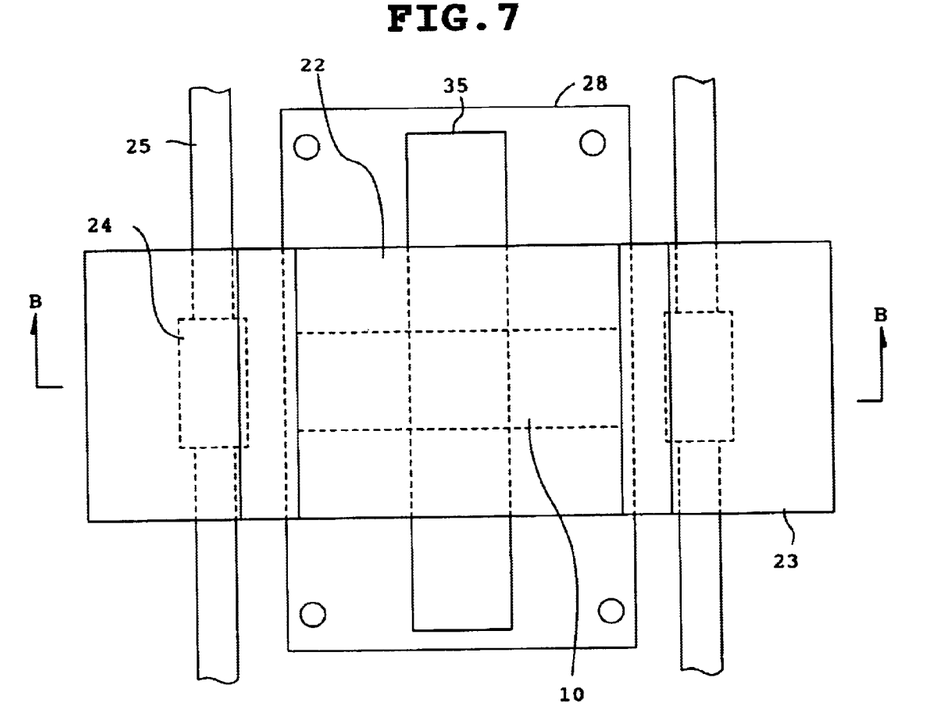
FIG. 7 is a perspective view showing a linear direct current motor of the present invention applied to a machine tool.
Figure 8:
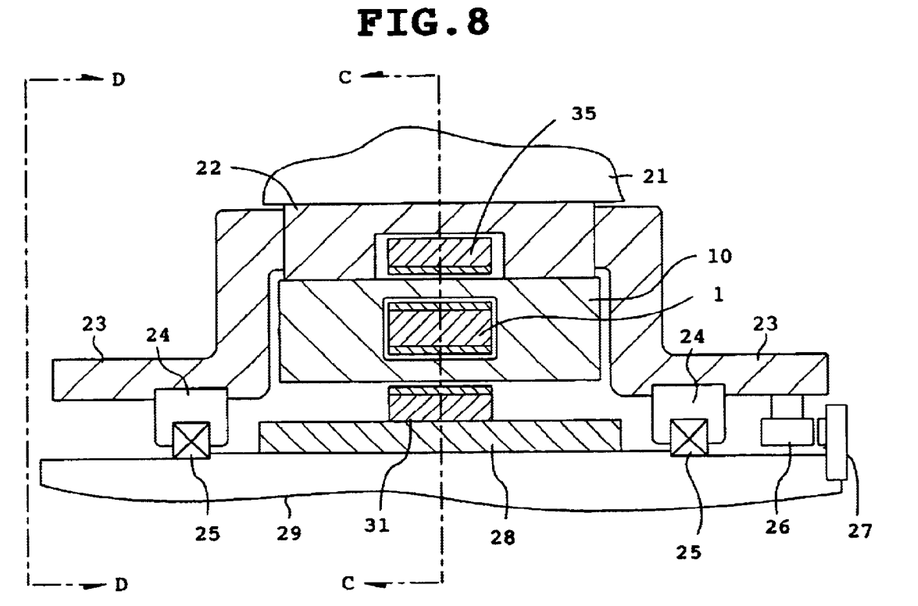
FIG. 8 is a cross sectional view showing the linear direct current motor viewed along the line B—B in FIG. 7.
Figure 9:
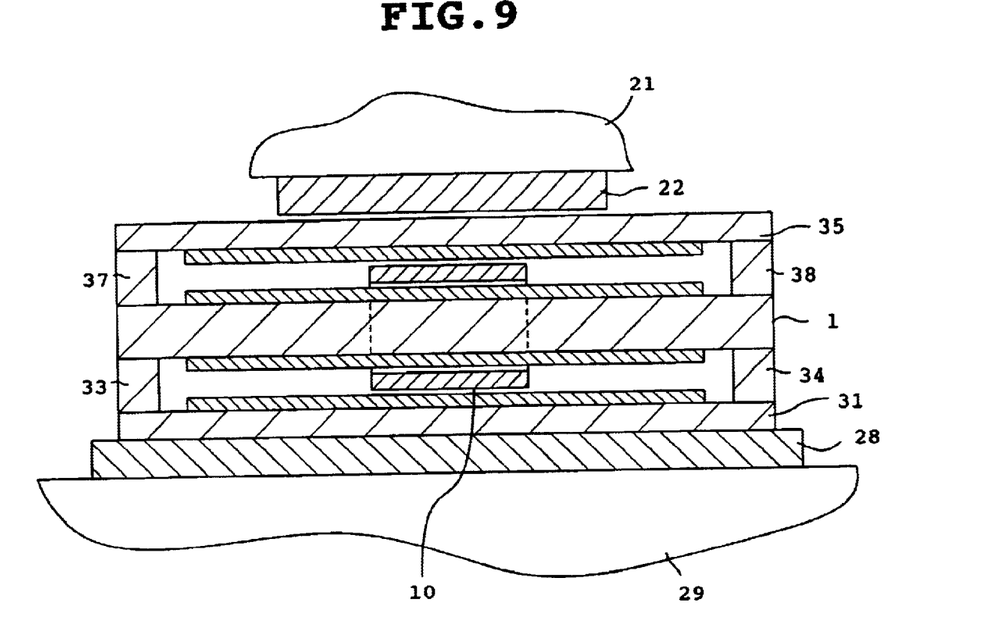
FIG. 9 is a cross sectional view showing the linear direct current motor viewed along the line C—C in FIG. 8.
Figure 10:
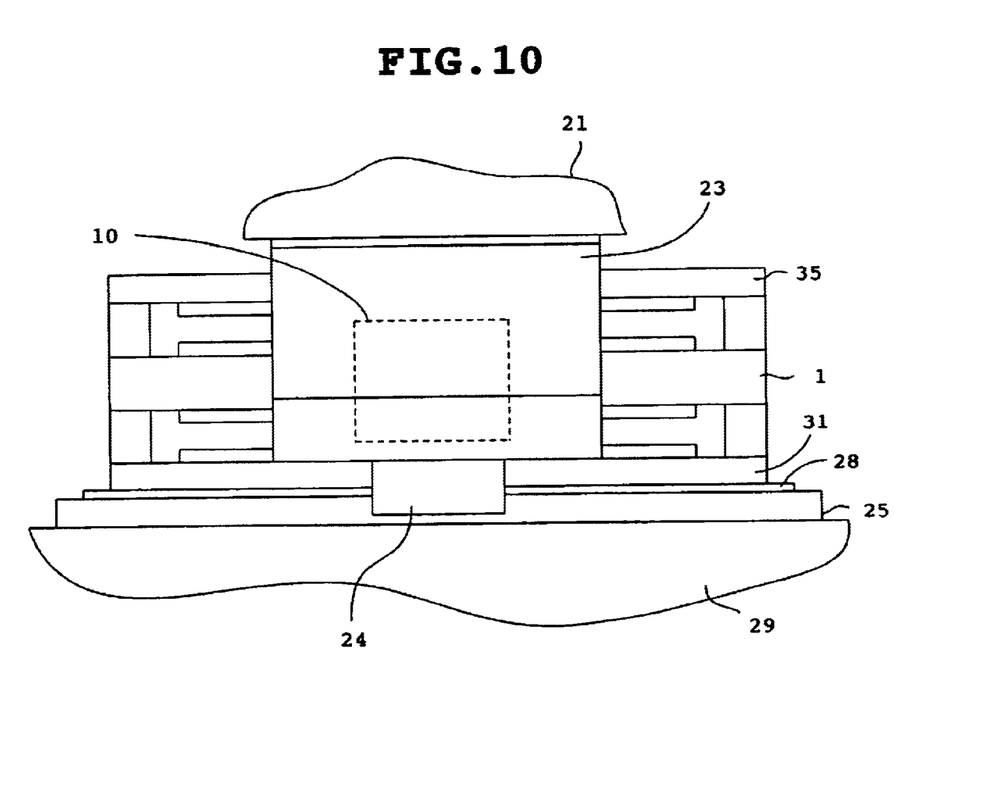
FIG. 10 is a side elevation showing the linear direct current motor viewed along the line D—D in FIG. 8.

First, a mold is prepared taking into consideration the cross sectional size of the center yoke 1 to which the permanent magnets 42 and 46 are attached. Using the mold, the flat cooling pipe 7 is bent into a U-shape. The cooling pipe 7 is connected to the manifold 9, preferably by brazing. Suitable insulating paper is wrapped around the cooling pipe 7 and the manifold 9, and the coil 5 is then wound on top of the insulating paper. As best seen in FIG. 6, a core 14, preferably in the form of a rectangular block that is capable of fitting into the openings 11A and 12A, is prepared. The core 14 is inserted into the U-shape fold of the cooling pipe 7. The core 14 and the manifold 9 are respectively fitted into the openings 11A and 11B in the plate 11. The core 14 and the manifold 9 are similarly respectively fitted into the openings 12A and 12B in the plate 12. Two lead wires and a single ground wire are passed through the holes 16 in the plate 11 and placed outside the coil assembly 10.

A rectangular mold 15 having an inner dimension that matches the outer dimension of the plates 11 and 12 covers the coil assembly. The mold 15 has holes formed in it for injecting resin. The plates 11 and 12 are screwed to the mold 15 using a plurality of bolts 15B. Resin is injected from the holes 15A into a gap surrounded by the mold 15 and the plates 11 and 12. A thermoset resin having a high heat transfer coefficient, for example epoxy resin, is preferably used.

After the resin has hardened, the core 14 and the mold 15 are removed from the coil assembly. In this way, a rectangular coil assembly 10 is formed. By removing the core 14, an opening capable of allowing the center yoke 1 with the permanent magnets 42 and 46 attached to pass through is formed inside the coil assembly 10.

A linear, direct current motor according to the present invention as applied to a machine tool will now be described with reference to FIG. 7, FIG. 8, FIG. 9 and FIG. 10. The reference numerals used in FIG. 2 are affixed to the same or corresponding elements in these figures, and explanation of those parts will be omitted.

In the illustrated embodiment, a base plate 28 is fixed in a detachable manner to a bed 29. A stator including the outer yokes 31 and 35 and the center yoke 1 is attached to the base plate 28. The coil assembly 10, being a mover, is connected to a saddle 21 by a connecting member 22. Flexible pipes for supply and discharge of coolant are attached to the manifold 9 inside the coil assembly 10. A pair of bearings 24, having built in balls or rollers, are attached to the connecting member 22 by respective brackets 23. A pair of linear rails 25 which engage with the bearings 24 are fixed to the bed 29. In this way, the saddle 21 is guided in the longitudinal direction of the stator. A linear scale 27 maybe attached to the bed 29, and a linear encoder 26 for detecting the position of the saddle 21 is attached to one of the brackets 23. A signal representing the detected position is fed back from the linear encoder 26 to an NC device (not shown in the drawing). The NC device controls current supplied to the coil 5 of the linear direct current motor in accordance with deviations in the instructed position and the detected position.

The illustrated embodiments were chosen in order to best explain the principles of the invention and its practical application. It is intended that the scope of the invention be defined by the claims hereto.

What is claimed is:

1. A linear direct current motor comprising:
    a center yoke extending in a longitudinal direction;
    an outer yoke arranged parallel to the center yoke;
    a permanent magnet for generating a magnetic field between the outer yoke and the center yoke;
    a coil assembly movable in the longitudinal direction and having an opening through which the center yoke passes; and
    wherein the coil assembly includes a flat cooling pipe having a cross section elongated in the longitudinal direction and a U-shaped fold for passing the center yoke through;
    a manifold having a cooling medium inlet and a cooling medium outlet and being connected to both ends of the cooling pipe, and
    a coil wound around the cooling pipe and the manifold.

2. The linear direct current motor according to claim 1, wherein the cooling pipe has a plurality of minute holes through which coolant can flow, said holes being aligned in the longitudinal direction.

3. The linear direct current motor according to claim 1, wherein the length of the elongated cross section of the cooling pipe is larger than the length of the coil in the longitudinal direction.

4. The linear direct current motor according to claim 1, wherein the permanent magnet is attached to at least one of the center yoke and the outer yoke.

5. The linear direct current motor according to claim 1, further comprising side yokes by which the respective ends of the center yoke and the outer yoke are respectively connected.

6. A linear direct current motor comprising:

a center yoke extending in a longitudinal direction;

upper and lower outer yoke both of which are arranged parallel to the center yoke on opposite sides thereof a first permanent magnet for generating a magnetic field between the upper outer yoke and the center yoke;

a second permanent magnet for generating a magnetic field between the lower outer yoke and the center yoke;

a coil assembly movable in the longitudinal direction and having an opening through which the center yoke passes; and wherein the coil assembly includes a flat cooling pipe having a cross section elongated in the longitudinal direction and a U-shaped fold for passing the center yoke through, a manifold having a cooling medium inlet and a cooling medium outlet and being connected to both ends of the cooling pipe, and a coil wound around the cooling pipe and the manifold.

7. The linear direct current motor according to claim 6, wherein the cooling pipe has a plurality of minute holes through which coolant can flow, said holes being aligned in the longitudinal direction.

8. The linear direct current motor according to claim 6, wherein the length of the elongated cross section of the cooling pipe is larger than the length of the coil in the longitudinal direction.

9. The linear direct current motor according to claim 6, wherein the first permanent magnet is attached to at least one of the center yoke and the upper outer yoke, and wherein the second permanent magnet is attached to at least one of the center yoke and the lower outer yoke.

10. The linear direct current motor according to claim 6, further comprising side yokes by which the respective ends of the center yoke and the upper outer yoke are respectively connected.

11. The linear direct current motor according to claim 6, further comprising side yokes by which the respective ends of the center yoke and the lower outer yoke are respectively connected.

12. A linear DC motor coil assembly having an opening through which a center yoke passes in a longitudinal direction, comprising:

a flat cooling pipe having a cross section elongated in the longitudinal direction and a U-shaped fold for passing the center yoke through;

a manifold having a cooling medium inlet and a cooling medium outlet and being connected to both ends of the cooling pipe; and a coil wound around the cooling pipe and the manifold.

13. The linear DC motor coil assembly according to claim 12, further comprising a pair of parallel flat plates having respective first openings through which the center yoke passes and respective second openings into which the manifold fitted, and wherein the cooling pipe and the coils are provided between the pair of parallel flat plates.

14. The linear direct current motor according to claim 12, wherein the cooling pipe has a plurality of minute holes through which coolant can flow, said holes being aligned in the longitudinal direction.

15. The linear direct current motor according to claim 12, wherein the length of the elongated cross section of the cooling pipe is larger than the length of the coil in the longitudinal direction.

16. A method of manufacturing a linear DC motor coil assembly having an opening through which a center yoke passes in a longitudinal direction, comprising the steps of:

bending a flat cooling pipe into a U-shaped fold for passing the center yoke through;

connecting both ends of the flat cooling pipe to a manifold to form a frame; and winding a coil around the flat cooling pipe and the manifold.

17. The method of manufacturing a linear DC motor coil assembly according to claim 16, further comprising the steps of:

inserting a core in the form of a rectangular block into the U-shaped fold;

fitting one ends of the manifold and the core into openings of an upper flat plate, respectively;

fitting the other ends of the manifold and the core into openings of a lower flat plate, respectively;

attaching the upper and lower flat plates to a rectangular mold for covering the flat cooling pipe, the manifold, the coil and the core;

injecting resin into a gap surrounded by the upper and lower flat plates and the mold; and removing the core and the mold.

* * * * *

UNITED STATES PATENT AND TRADEMARK OFFICE
CERTIFICATE OF CORRECTION

PATENT NO.     : 6,657,327 B2
DATED          : December 2, 2003
INVENTOR(S)    : Satoru Tajima et al.

Page 1 of 1

It is certified that error appears in the above-identified patent and that said Letters Patent is hereby corrected as shown below:

<u>Title page,</u>
Item [22], PCT Filed, change "May" to -- March --

Signed and Sealed this

Seventh Day of September, 2004

JON W. DUDAS
*Director of the United States Patent and Trademark Office*